United States Patent [19]
Jovanovics et al.

[11] 3,899,493
[45] Aug. 12, 1975

[54] CHROMIC ACID OXIDATION OF VINBLASTINE SULFATE TO FORM VINCRISTINE

[75] Inventors: Karolina Jovanovics; Kálmán Szász; György Fekete; Emil Bittner; Eszter Dezséri; János Éles, all of Budapest, Hungary

[73] Assignee: Richter Gedeon Vegyeszeti Gyar R.T., Budapest, Hungary

[22] Filed: Dec. 29, 1972

[21] Appl. No.: 319,468

[52] U.S. Cl. .............................. 260/287 P; 260/687
[51] Int. Cl.² ...................................... C07D 459/00
[58] Field of Search ................................ 260/287 R

[56] References Cited
UNITED STATES PATENTS

| | | | |
|---|---|---|---|
| 3,225,030 | 12/1965 | Suoboda | 260/287 R |
| 3,354,163 | 12/1966 | Gorman | 260/287 R |
| 3,392,173 | 6/1968 | Hargrove | 260/287 R |
| 3,483,210 | 12/1969 | Rosenblatt | 260/294.7 |

OTHER PUBLICATIONS
House, "Modern Synthetic Reactions," 1965, pg. 81.
March, "Advanced Organic Chemistry," 1968 pp. 850.
ibid pp. 880–881.

*Primary Examiner*—Donald G. Daus
*Assistant Examiner*—David E. Wheeler
*Attorney, Agent, or Firm*—Waters, Schwartz & Nissen

[57] ABSTRACT

Vincristine is prepared in a semisynthetic process starting from vinblastine. Vinblastine or a salt thereof, preferably the sulphate, is oxidized with chromic acid or with one of its salts at a low temperature, the reaction mixture is neutralized or rendered alkaline and the product is separated therefrom by extraction, the extract is evaporated to dryness, the dry residue is optionally formylated, vincristine, and optionally N-demethylvinblastine too, are isolated from the product, and the product(s) are optionally converted into their salts, preferably into the sulphates.

3 Claims, No Drawings

CHROMIC ACID OXIDATION OF VINBLASTINE SULFATE TO FORM VINCRISTINE

This invention relates to a semisynthetic process for the preparation of vincristine.

The cytostatic alkaloids of *Vinca rosea L.* (*Catharantus roseus G. Don*), i.e. vinblastine and vincristine are known for about ten years, and on the basis of clinical investigations they proved to be the most effective cytostatic chemotherapeutics. First of all the results achieved with vincristine are remarkable, since this compound has e.g. a life-saving action in acute leukemie of children (Haggard, M. E.: Vincristine therapy for acute leukemie in children; Cancer Chemother. Reports, 52, 477 /1968/).

As it is known, vincristine is present only in a few amount in the very sophisticated alkaloid spectrum of Vinca rosea L. Not more than 0.1% of vincristine can be separated from the total alkaloid mixture containing about 70 kinds of alkaloids, which means a yield of about 3 to 5 mg. of vincristine calculated for 1 kg. of dry drug. The processes described in U.S. Pat. No. 3,205,220 and Hungarian Pat. No. 160,967 make possible the separation of vincristine in the above-mentioned amount.

Due to the invaluable therapeutical significance of vincristine several investigations were and are carried out all over the world for its preparation in higher amounts and with lower costs.

As it is known N-dimethyl-vinblastine, the common decomposition product of vinblastine and vincristine, can be formylated according to known processes to yield vincristine (U.S. Pat. No. 3,354,163). In the specification there is mentioned that vinblastine can be oxidized into N-demethyl-vinblastine in a biological oxidation process using a peroxidaze enzyme in the presence of hydrogen peroxide, and the demethylated product, in turn, can be formylated in a way known per se to yield vincristine. This specification, however, does not give any example for this synthesis, and no further directives can be derived regarding the biological oxidation of vinblastine and the yield of the product.

When investigating the oxidation of vinblastine, we have found, unexpectedly, that if vinblastine or an acid addition salt thereof, preferably the sulphate is oxidized with chromic acid or its salt at low temperature, the N-methyl group of vinblastine can be directly converted into formyl group.

This selective oxidation is in contradistinction with the disclosure of U.S. Pat. No. 3,354,163 and was not aforeseen for one skilled in the art, since the vinblastine molecule contains several groups which are far more sensitive to oxidation than the N-methyl group.

Accordingly, this invention relates to a semisynthetic process for the preparation of vincristine, in which vinblastine or a salt thereof, preferably the sulphate is oxidized with chromic acid or with one of its salts at a low temperature, the reaction mixture is neutralized or rendered alkaline and the product is separated therefrom by extraction, the extract is evaporated to dryness, the dry residue is optionally formylated, vincristine, and optionally N-demethyl-vinblastine too, are isolated from the product, and the product(s) are optionally converted into their salts, preferably into the sulphates. The salts can be purified by recrystallization, if necessary.

According to the invention one proceeds as follows: vinblastine or its salt, preferably the sulphate, is dissolved in an organic solvent or solvent mixture, preferably in a mixture of glacial acetic acid and acetone, the mixture is cooled to a temperature below 0°C, preferably to −30° to −90°C, an organic solution preferably an acetic anhydride solution of chromic acid or a chromic acid salt, previously cooled to the temperature of the vinblastine solution, is added to the vinblastine solution with intensive stirring and cooling, thereafter the reaction mixture is allowed to stand for maximum 15 minutes, preferably for 8 minutes. Thereafter ammonium hydroxide of −40° to −50°C temperature is added cautiously to the mixture to adjust the pH to 8 to 9, the mixture is diluted with water, and the aqueous mixture is extracted in several portions with an organic solvent, preferaby with methylene chloride, until a negative alkaloid reaction is reached. The extracts are combined, washed with water, dried, and evaporated to dryness under reduced pressure. The obtained amorphous crude vincristine base, containing N-demethyl-vinblastine as impurity, is purified by chromatography, using a column of aluminum oxide wetted with benzene. Crude vincristine is dissolved in benzene, and the solution is passed through the column. Elution is carried out with a 2:1 and 1:1 mixture of benzene and chloroform. The alkaloids present in the individual fractions are identified by paper or thin layer chromatography, and the fractions containing vincristine, or N-demethyl-vinblastine, respectively, are combined. The combined fractions are evaporated to dryness. The thus-obtained vincristine and N-demethyl-vinblastine, respectively, are optionally converted into their salts, preferably into the sulphates. The salts can be purified by recrystallization, if necessary.

According to a particularly preferred method of the invention the vincristine-containing dry residue, obtained when working up the reaction mixture after the oxidation process, is formylated with a mixture of formic acid and acetic anhydride. In this reaction N-demethyl-vinblastine, present in the dry residue as impurity, converts into vincristine. Thereafter the reaction mixture is neutralized, extracted with methylene chloride, the extracts are combined, washed with water, and evaporated to dryness under reduced pressure to yield vincristine as dry residue. The thus-obtained product is purified by chromatography, and is converted into a salt, preferably into the sulphate, if desired. The salt can be purified by recrystallization, if necessary.

The invention is further elucidated by the acid of the following non-limiting Examples.

EXAMPLE 1

10 g. (0.011 moles) of vinblastine sulphate are dissolved in 2200 ml. of acetone and 500 ml. of glacial acetic acid are added to the solution. The mixture is cooled to −60°C. In the same time 4.96 g. (0.0494 moles) of chromic acid are dissolved in 1860 ml. of acetic anhydride, the solution is cooled to −60°C, and added dropwise to the vinblastine sulphate solution with intensive stirring. After 8 minutes of stirring 4400 ml. of concentrated ammonium hydroxide of −40° to −50°C temperature are added dropwise to the reaction mixture, to adjust the pH to 8. During this process the temperature of the solution may not raise above +50°C. The obtained alkaline mixture is diluted with 10 l. of water and extracted with methylene chloride until a negative alkaloid reaction is reached. The methylene chloride extracts are combined and washed with 2 × 3000 ml. of water in order to remove ammonium acetate formed in the neutralization process. The methylene chloride solution is dried and evaporated to dryness under reduced pressure. 8.5 g. of amorphous, crude vincristine are obtained, containing N-demethyl-vinblastine as impurity. The obtained amorphous, crude vincristine is dissolved in 30 ml. of benzene, and the solution is passed through a column of aluminium oxide wetted with benzene. Elution is started with 1300 ml. of benzene, thereafter 5500 ml. of a 2:1 mixture of benzene and chloroform are used as eluting agent, and elution is finished with 4250 ml. of an 1:1 mixture of benzene and chloroform. The effluent is collected into fractions of 250 ml. volume. The individual fractions are subjected to paper or thin layer chromatography. N-demethyl-vinblastine impurity, formed in the oxidation as by-product, can be eluted with the 2:1 mixture of benzene and chloroform, while vincristine appears in the 1:1 mixture of benzene and chloroform. The fractions containing the same alkaloids as determined by paper or thin layer chromatography are combined, and evaporated to dryness under reduced pressure. 5.9 g. of amorphous vincristine, as well as 2.7 g. of amorphous N-demethyl-vinblastine are obtained.

Amorphous N-demethyl-vinblastine is dissolved in 27 ml. of dry ethanol, and the pH of the solution is adjusted to 4.0 with 1 % ethanolic sulphuric acid, to precipitate N-demethyl-vinblastine sulphate in crystalline form. The obtained 2.5 g. of N-dimethyl-vinblastine sulphate are dissolved in 15 ml. of methanol, and 60 ml. of dry ethanol are added to the solution. The mixture is allowed to stand for 1 hour at room temperature, thereafter the separated crystalline N-demethyl-vinblastine sulphate is filtered off. 2.2 g. (0.0024 moles) of N-demethyl-vinblastine sulphate are obtained. Yield: 20 %.

The base is liberated from a sample of the obtained N-demethyl-vinblastine sulphate, and the free base is identified on the basis of the following data:

M.p.: 212°–214°C (Boetius)

$(\alpha)_D^{20} = +15.8°$ ($c = 1$, in chloroform).

N-demethyl-vinblastine, formed in the oxidation of vinblastine, or a salt thereof can be formylated according to known procedures to yield vincristine or a salt thereof.

The obtained 5.9 g. of amorphous vincristine are dissolved in 60 ml. of dry ethanol, and the solution is acidified with 1% ethanolic sulphuric acid to pH = 4.0 to yield crystalline vincristine sulphate. The obtained 5.6 g. of vincristine sulphate are dissolved in 30 ml. of methanol, and 120 ml. of dry ethanol are added to the solution. The mixture is allowed to stand at room temperature for one hour, and the separated crystalline vincristine sulphate is filtered off.

5.2 g. (0.0055 moles) of vincristine sulphate are obtained. Yield: 50 %.

$(\alpha)_D^{20} = +11°$ to $+12°$ ($c = 1$, in water)

$R_f = 0.30$ (appears with vivid blue colour)

The product is identified on the basis of its IR spectrum, containing a very intensive absorption band at 5.94 /$\mu$, as compared to the IR spectrum of vinblastine.

The thin layer chromatographical examinations were carried out on "aluminum oxide G. Merck" adsorbent. Chloroform containing 0.5% of methanol was used as eluting agent, while developing was carried out with concentrated phosphoric acid containing 1% of cerium ammonium sulphate.

EXAMPLE 2

5 g. (0.0055 moles) of vinblastine sulphate are dissolved in 1100 ml. of acetone, thereafter 250 ml. of 99.5% glacial acetic acid (distilled from chromic acid and containing no oxidizable materials) are added to the solution. The mixture is cooled to −60°C. In the same time 2.48 g. (0.0297 moles) of chromic acid are dissolved in 930 ml. of acetic anhydride, the solution is cooled to −60°C, and added into the vinblastine sulphate solution with stirring. The reaction mixture is stirred for 8 minutes, thereafter the pH of the mixture is adjusted to 9.0 by the dropwise addition of concentrated ammonium hydroxide of −40° to −50°C temperature. During this procedure the temperature of the mixture may not raise above +50°C. The alkaline mixture is diluted with 5000 ml. of water, and extracted with 3 × 1000 ml. of methylene chloride until a negative alkaloid reaction is reached. The methylene chloride phases are combined and washed with 2 × 1500 ml. of water in order to remove ammonium acetate formed in the neutralization process. The methylene chloride solution is dried and evaported to dryness under reduced pressure. The residue is dissolved in a mixture of 75 ml. of concentrated formic acid and 12.5 ml. of acetic anhydride, and the mixture is allowed to stand at room temperature for 5 minutes. The acidic solution is diluted with water to three-fold volume, rendered alkaline (pH = 9) with concentrated ammonium hydroxide under cooling, and the alkaloid is extracted with 3 × 100 ml. of methylene chloride. The methylene chloride solutions are combined, dried, and evaporated to dryness under reduced pressure. The vincristine-containing dry residue is dissolved in 20 ml. of benzene, and the solution is passed through an aluminium oxide column of IV–V activity grade, wetted with benzene. Elution is started with 500 ml. of benzene, thereafter 1000 ml. of a 9:1 mixture of benzene and chloroform, 700 ml. of a 8.5:1.5 mixture of benzene and chloroform, and 2300 ml. of a 8:2 mixture of benzene and chloroform are used as eluting agent. Elution is finished with a 1:1 mixture of benzene and chloroform. The effluent is collected into fractions of 250 ml. volume. Benzene, and the 9:1 and 8.5:1.5 mixtures of benzene and chloroform serve to separate the adsorbed substances; alkaloid appears first in the fractions obtained with the first portion of the 8:2 mixture of benzene and chloroform. These fractions are combined and evaporated to dryness under reduced pressure, yielding a by-product in an amount of 5 to 10% calculated for the weight of vincristine sulphate endproduct. This by-product is formed during the oxidation process. Vincristine appears first with the second portion of the 8:2 mixture of benzene and chloroform, and the elution of vincristine terminates with the 1:1 mixture of benzene and chloroform. Fractions containing vincristine, as determined by layer and paper chromatography, are combined, and evaporated to dryness under reduced pressure. The obtained 3.8 g. of dry residue are dissolved in 40 ml. of dry ethanol, and the solution is acidified to pH = 4.0 with 1% ethanolic sulphuric acid. Vincristine separates in the form of its sulphate. The separated precipitate is filtered off, dissolved in 30 ml. of methanol, and 120 ml. of dry ethanol are added to the solution.

After 1 hour of standing vincristine sulphate separates in crystalline form. The product is filtered off, washed, and dried. 3.5 g. (0.0039 moles) of vincristine sulphate are obtained.

Yield: 70%. The physical constants of the product are identical to those listed in Example 1.

What we claim is:

1. A process for the preparation of vincristine, comprising the steps of oxidizing the sulfate salt of vinblastine with chromic acid in an organic solvent selected from the group consisting of acetic acid and mixtures of glacial acetic acid and acetone at a temperature of about −60°C, adjusting the reaction mixture to a pH of 7–9 and recovering the vincristine.

2. A process according to claim 1, wherein said mixture of glacial acetic acid and acetone is in a ratio of 4:1.

3. A process according to claim 1, wherein after the oxidation step, the pH is adjusted to 7–9 with concentrated ammonium hydroxide solution at a temperature no greater than 50°C.

* * * * *